(12) United States Patent
Brunner et al.

(10) Patent No.: US 8,189,070 B1
(45) Date of Patent: May 29, 2012

(54) IMAGE CAPTURING DEVICES USING SUNNY F/16 RULE TO OVERRIDE METERED EXPOSURE SETTINGS

(75) Inventors: Ralph Brunner, Cupertino, CA (US); Monique Perez Relova, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 289 days.

(21) Appl. No.: 12/479,743

(22) Filed: Jun. 5, 2009

(51) Int. Cl.
*H04N 5/235* (2006.01)
*H04N 9/73* (2006.01)
*H04N 5/238* (2006.01)

(52) U.S. Cl. ............. 348/229.1; 348/221.1; 348/228.1; 348/364; 348/366

(58) Field of Classification Search .............. None
See application file for complete search history.

(56) References Cited

U.S. PATENT DOCUMENTS

| | | | |
|---|---|---|---|
| 3,314,344 A | | 4/1967 | Anwyl et al. |
| 4,748,468 A | | 5/1988 | Fujino et al. |
| 5,038,165 A | * | 8/1991 | Amanuma et al. ............ 396/103 |
| 5,606,391 A | | 2/1997 | Aoki et al. |
| 5,838,373 A | | 11/1998 | Hasegawa et al. |
| 6,630,960 B2 | | 10/2003 | Takahashi et al. |
| 7,619,681 B2 | * | 11/2009 | Kubota .......................... 348/362 |
| 7,720,372 B2 | * | 5/2010 | Nishiwaki ..................... 396/222 |
| 2005/0259177 A1 | * | 11/2005 | Senoo ............................. 348/362 |
| 2006/0044459 A1 | * | 3/2006 | Kato .............................. 348/362 |
| 2007/0096024 A1 | | 5/2007 | Furuya et al. |
| 2008/0050109 A1 | * | 2/2008 | Noyes et al. .................. 396/234 |
| 2008/0111913 A1 | * | 5/2008 | Okamoto ....................... 348/363 |
| 2008/0297622 A1 | * | 12/2008 | Miyashita ................... 348/229.1 |
| 2009/0003819 A1 | * | 1/2009 | Nishiwaki .................... 396/222 |
| 2009/0034953 A1 | * | 2/2009 | Hwang et al. .................. 396/95 |
| 2009/0096902 A1 | * | 4/2009 | Kobayashi .................... 348/296 |
| 2009/0147122 A1 | * | 6/2009 | Kato ......................... 348/333.01 |

OTHER PUBLICATIONS

""F-Number"", *Wikipedia*, http://en.wikipedia.org/wiki/F-number, (Mar. 30, 2009), 11 pages.
""Gray Card"", *Wikipedia*, http://en.wikipedia.org/wiki/Gray_card, (Mar. 28, 2009), 2 pages.
""Sunny 16 Rule"", *Wikipedia*, http://en.wikipedia.org/wiki/Sunny_16, (Mar. 5, 2009), 2 pages.

* cited by examiner

*Primary Examiner* — Nhan T Tran
*Assistant Examiner* — John H Morehead, III
(74) *Attorney, Agent, or Firm* — Blakely, Sokoloff, Taylor & Zafman LLP (57) ABSTRACT

Several methods and apparatuses for implementing automatic exposure mechanisms for image capturing devices are described. In one embodiment, an automatic exposure mechanism can use data from a light meter of an image capturing device to determine a metered exposure value associated with incident light. The automatic exposure mechanism can determine a rule based exposure value based on a predetermined rule and exposure settings (e.g., a predetermined light sensitivity of a capture media and a predetermined f-number of the image capturing device). The automatic exposure mechanisms can select either the metered exposure value or the rule based exposure value to set an exposure setting for the image capturing device.

14 Claims, 7 Drawing Sheets

| FOCAL-NUMBER | 16 | 11 | 8 | 5.6 | 4 | 2.8 |
|---|---|---|---|---|---|---|
| ISO 25 EXPOSURE TIME | 1/25 | 1/50 | 1/100 | 1/200 | 1/400 | 1/800 |
| ISO 100 EXPOSURE TIME | 1/100 | 1/200 | 1/400 | 1/800 | 1/1600 | 1/3200 |
| ISO 200 EXPOSURE TIME | 1/200 | 1/400 | 1/800 | 1/1600 | 1/3200 | 1/6400 |

IMAGE CAPTURING DEVICES USING SUNNY F/16 RULE TO OVERRIDE METERED EXPOSURE SETTINGS

Embodiments of the invention are generally related to image capturing devices and more particularly to determining exposure settings for the image capturing devices.

BACKGROUND

Image capturing devices include cameras, portable handheld electronic devices, and other electronic devices. These image capturing devices use an automatic exposure mechanism to automatically calculate and adjust exposure settings in order to match as closely as possible a subject's mid-tone to the mid-tone of the photograph. "Correct" exposure may be defined as an exposure that achieves the effect the photographer intended. The purpose of exposure adjustment (in combination with lighting adjustment) is to control the amount of light from the subject that is allowed to fall on the film or image sensor, so that it falls into an appropriate region of the characteristic curve of the film or image sensor and yields a "correct" or acceptable exposure. A photograph may be described as overexposed when it has a loss of highlight detail. This can result in the bright parts of an image being effectively all white. A photograph may be described as underexposed when it has a loss of shadow detail. This can result in the dark areas of the image being indistinguishable from black.

Figure 1:
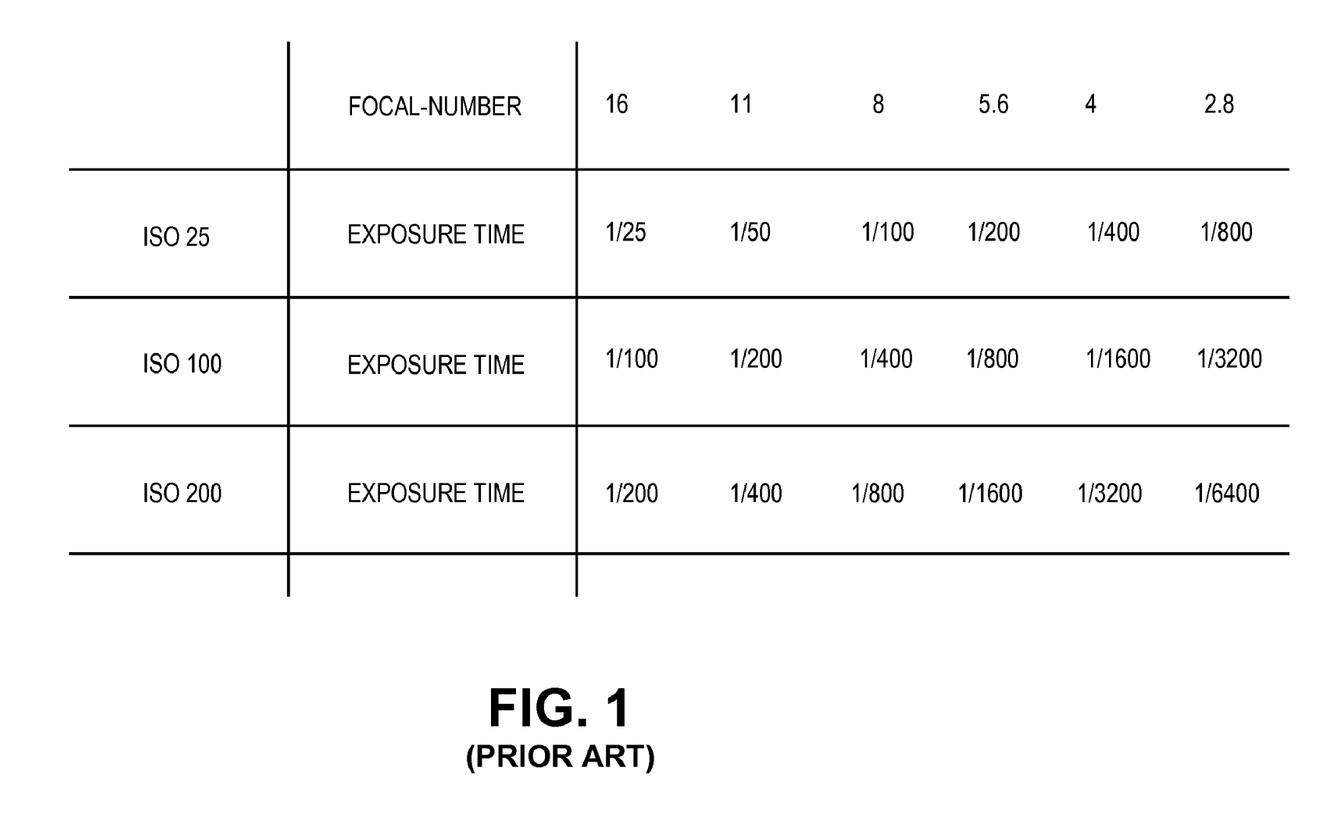
FIG. 1 is a chart showing applications of the Sunny f/16 rule for different film speeds and different shutter speeds.

One approach for determining the exposure setting for an image on a bright sunny day is the Sunny f/16 rule. This rule is a method of estimating correct daylight exposures without a light meter. The basic rule for a sunny day sets aperture to f/16 and shutter speed to the ISO film speed. For example, for a sunny day with ISO film 100 in the camera, one sets the aperture to f/16 and the shutter speed to 1/100 or 1/125 (on most cameras 1/125 is the available setting nearest to 1/100 second). For a sunny day with ISO film 200 in the camera, one sets the aperture to f/16 and the shutter speed to 1/200 or 1/250. The aperture and shutter speed can be jointly adjusted to achieve the same exposure (e.g., for ISO film 200, the aperture setting of f/8 and shutter speed of 1/500 is equivalent to ISO 200, f/16 and 1/250). FIG. 1 illustrates applications of the Sunny f/16 rule for different film speeds and different shutter speeds. As with other light readings, shutter speed can be changed as long as the f-number is altered to compensate.

SUMMARY

Several methods and apparatuses for implementing automatic exposure mechanisms for image capturing devices are described. In one embodiment, an automatic exposure mechanism uses data from a light meter of an image capturing device to determine a metered exposure value associated with incident light. The automatic exposure mechanism can determine a rule based exposure value based on a predetermined rule and exposure settings (e.g., a light sensitivity of a capture media and a f-number of the image capturing device which can be fixed or set by a user if it is adjustable). The automatic exposure mechanism can determine whether the metered exposure value is greater than the rule based exposure value. The automatic exposure mechanism can set an exposure time using the rule based exposure value rather than the metered exposure value if the metered exposure value is greater than the rule based exposure value. The automatic exposure mechanism can set an exposure time using the metered exposure value if the metered exposure value is less than or substantially equal to the rule based exposure value. After the automatic exposure mechanism sets the exposure time, a still image or video can be captured with the image capturing device.

For example, a user may be attempting to photograph a bright scene. The automatic exposure mechanism may determine a brightness exceeding a brightness for sunlight. The automatic exposure mechanism then applies a predetermined rule to limit the exposure settings to not exceed a brightness of sunlight.

Other embodiments are also described. Other features of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several methods and apparatuses for implementing automatic exposure mechanisms for image capturing devices are described. In one embodiment, an automatic exposure mechanism uses data from a light meter of an image capturing device to determine a metered exposure value associated with incident light. The automatic exposure mechanism can determine a rule based exposure value based on a predetermined rule and exposure settings (e.g., a light sensitivity of a capture media and a f-number of the image capturing device which can be fixed or set by a user if it is adjustable). The automatic exposure mechanism can determine whether to use the metered exposure value or the rule based exposure value and can select one of these exposure values. For example, a user may be attempting to photograph outdoors on a sunny day. The automatic exposure mechanism may determine a brightness exceeding a brightness for sunlight. The automatic exposure mechanism can then advantageously apply a predetermined rule to limit the exposure settings to not exceed the brightness of sunlight. After the automatic exposure mechanism sets the exposure time based on a metered exposure value or a rule based exposure value, a still image or video can be captured with the image capturing device.

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

Figure 2:
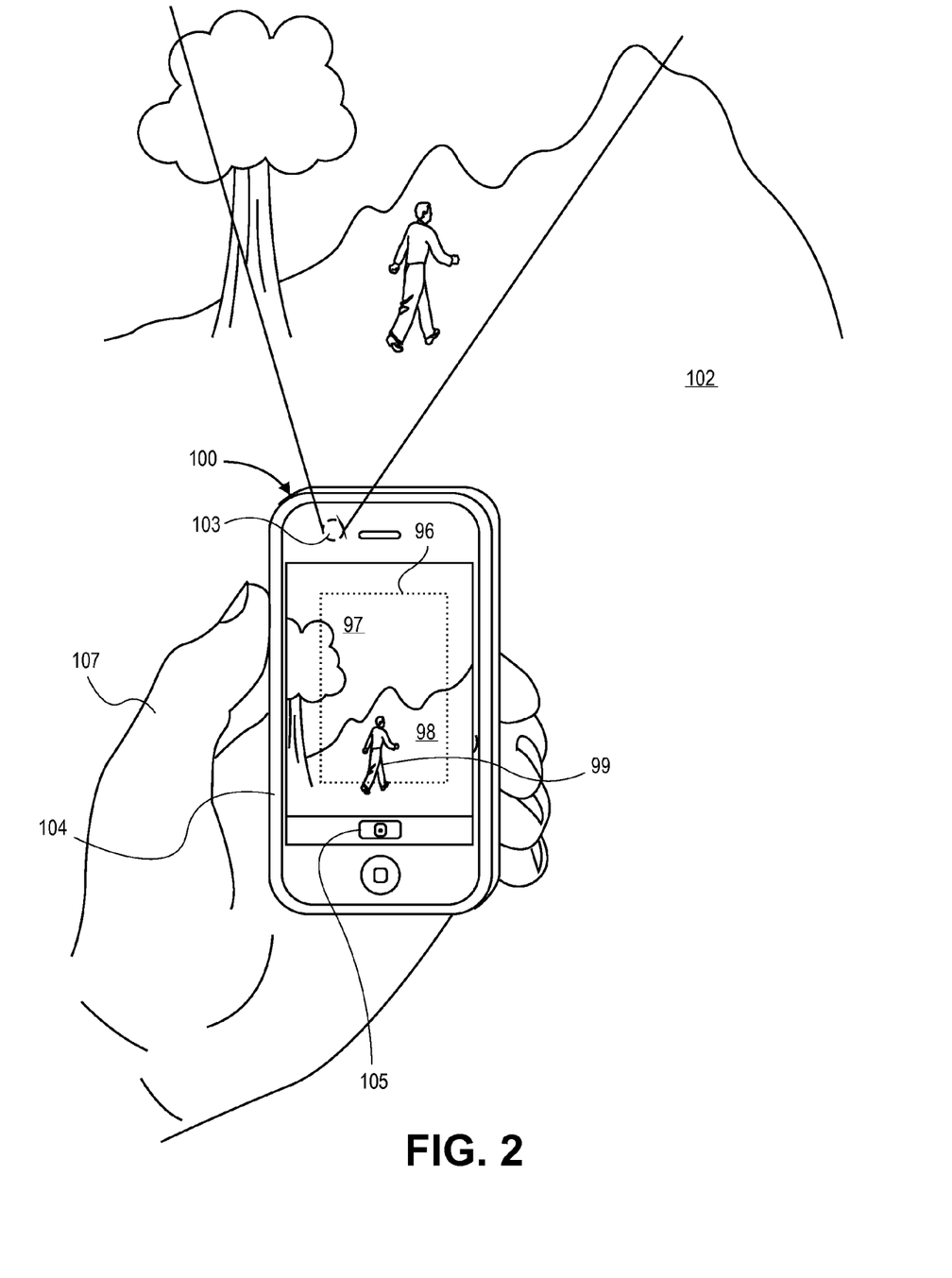
FIG. 2 shows a portable handheld device having a built-in digital camera and a touch sensitive screen in accordance with one embodiment.

FIG. 2 shows a portable image capturing device 100 having a built-in digital camera in accordance with one embodiment. In this example, the portable device 100 is shown while it is held in the user's hand 107. The device 100 may be an IPHONE device by Apple Inc., of Cupertino, Calif. Alternatively, it could be any other electronic device that has a built-in digital camera. The built-in digital camera includes a lens 103 located in this example on the back face of the device 100. The lens may be a fixed optical lens system or it may have focus and optical zoom capability. Although not depicted in FIG. 2, inside the device 100 are an electronic image sensor and associated hardware circuitry and running software that can capture a digital image of a scene 102 that is before the lens 103.

The digital camera functionality of the device 100 includes an electronic or digital viewfinder. The viewfinder displays captured still images or video (e.g., a series of images) of the scene 102 that is before the camera, on a portion of the touch sensitive screen 104 as shown. In this case, the digital camera also includes a soft or virtual shutter button whose icon 105 is displayed by the screen 104, directly below the viewfinder image area. As an alternative or in addition, a physical shutter button may be implemented in the device 100. The device 100 includes all of the needed circuitry and/or software for implementing the digital camera functions of the electronic viewfinder, shutter release, and automatic exposure mechanism as described below.

In FIG. 2, the scene 102 is displayed on the screen. Upon execution of an automatic exposure mechanism, a light meter may receive incident light associated with a metered area 96 that is used by the device for determining exposure settings. The metered area 96 includes a brighter section 97 (e.g., bright sky) and a darker section (e.g., ground 98 along with the subject 99). The automatic exposure mechanism can provide a metered exposure value. This exposure value may need to be adjusted if it exceeds a rule based exposure value.

Additional details of this automatic exposure mechanism will be explained below. Once the exposure settings have been adjusted, the picture can be taken, for example, when the user gives the shutter release command.

Figure 3:
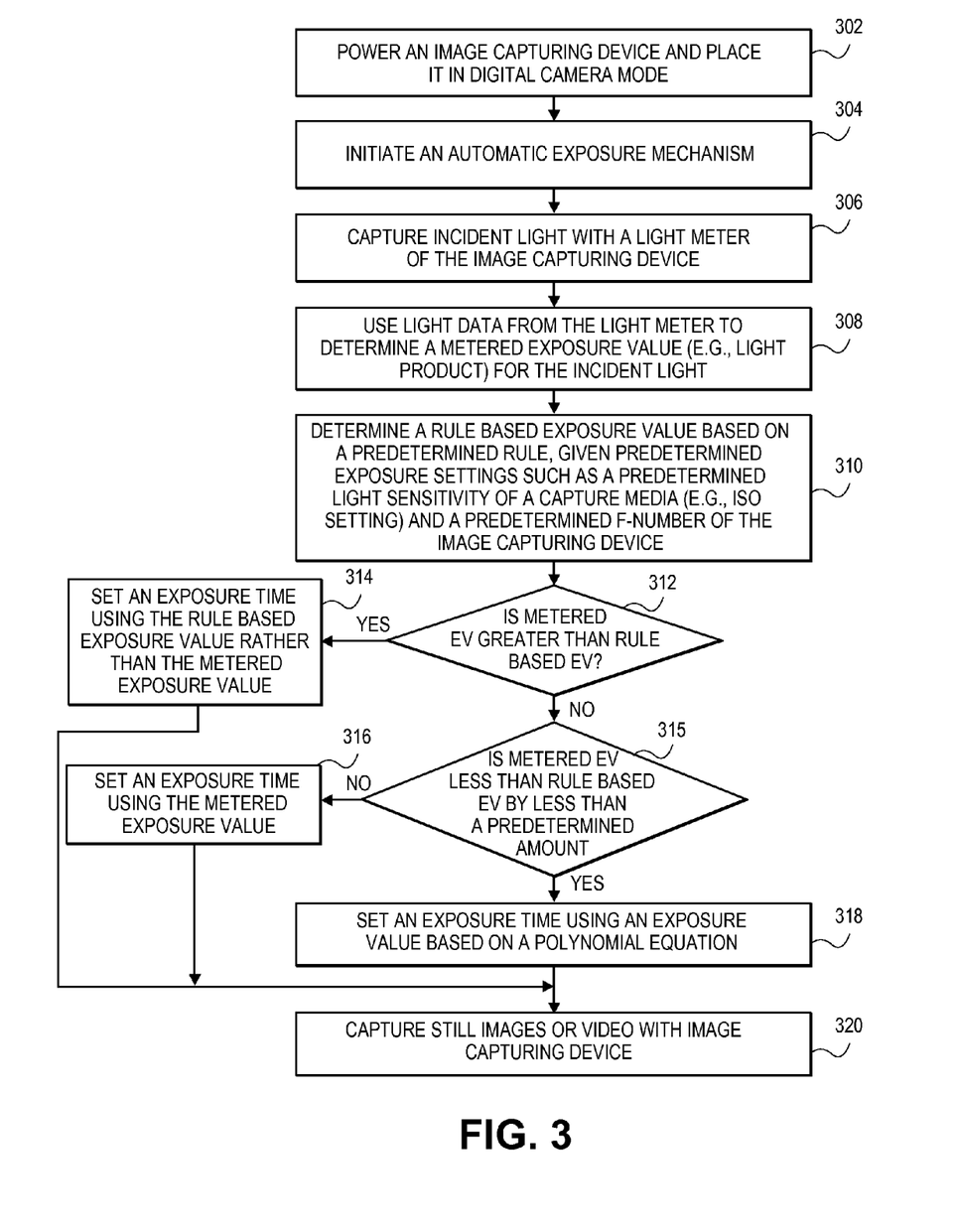
FIG. 3 illustrates a flow diagram of operations for an automatic exposure mechanism in accordance with some embodiments.

FIG. 3 illustrates a detailed flow diagram of operations for the automatic exposure mechanism in accordance with certain embodiments. A user of the device powers the device 100 and places it in digital camera mode at block 302. An automatic exposure mechanism initiates at block 304 when the device is placed in the digital camera mode. The automatic exposure mechanism, which may be executed by a processing circuit or processing logic, may capture incident light with a light meter of the image capturing device at block 306. The automatic exposure mechanism can use light data from the light meter to determine a metered exposure value (e.g., light product) for the incident light at block 308. The exposure value may be a function of exposure time (e.g., shutter speed), film speed or ISO setting for digital cameras, and f-number (e.g., aperture size). Film speed is the measure of a photographic film's or sensor's sensitivity to light.

In one embodiment, the light product equals (exposure time*(film speed or ISO))/(aperture size*aperture size). In an embodiment, the ISO can be proportional to the product of all internal gain factors. Prior to taking a still image or capturing video, the automatic exposure mechanism can determine the exposure time, film speed or ISO, and aperture size. The film speed or ISO and aperture size may be predetermined. The exposure time may be set by the automatic exposure mechanism using the metered exposure value of a light meter.

In some embodiments, at block 310, the automatic exposure mechanism can determine a rule based exposure value based on a predetermined rule, given predetermined exposure settings such as a predetermined sensitivity of a capture media (e.g., film, image sensor of digital camera having ISO setting) to light and a predetermined f-number of the image capturing device. The f-number may be adjusted by a user or a fixed aperture which cannot be adjusted. Film speed is the measure of a photographic film's sensitivity to light. Relatively insensitive film with a correspondingly lower speed index requires more exposure to light to produce the same image density as a more sensitive film, and is thus commonly termed a slow film. Highly sensitive films are correspondingly termed fast films. Next, at block 312, the automatic exposure mechanism in a predetermined manner compares the metered exposure value and the rule based exposure value. In one embodiment, the predetermined manner can determine whether the metered exposure value is greater than the rule based exposure value (or substantially equal to the rule based exposure value).

At block 314, the automatic exposure mechanism can set an exposure time or an aperture setting (or a combination of exposure time and aperture setting) using the rule based exposure value rather than the metered exposure value based on a comparison in a predetermined between the rule and metered exposure values. For example, if the metered exposure value is greater than the rule based exposure value (or substantially equal to the rule based exposure value), then the rule based exposure value may be selected. In one embodiment, the rule based exposure value (e.g., sunlight exposure value) is for sunlight reflected from a reference object (e.g., 18% gray card). Sunlight is the brightest light that an image capturing device will encounter. The automatic exposure mechanism can determine exposure time, aperture size, and ISO setting based upon using the light data from the light meter. Alternatively, the aperture size and ISO setting may be predetermined and only the exposure time is determined using the light data. If the automatic exposure mechanism determines that the incident light is brighter than sunlight, then maximum limits corresponding to sunlight conditions for the exposure settings can be applied using the rule based exposure value because the scene can not be brighter than sunlight. For example, a bright scene (e.g., snow or white sand) may cause the automatic exposure mechanism to determine an exposure value greater than an exposure value of sunlight reflected from a 18% gray card (e.g., 14.5 EV). In this case, setting maximum limits prevents a bright scene from appearing to be gray.

At block 315, the automatic exposure mechanism determines whether the metered exposure value is less than the rule based exposure value by less than a predetermined amount. At block 316, the automatic exposure mechanism can set an exposure time (or an aperture setting if the aperture is configured to automatically adjust) using the metered exposure value if the metered exposure value is less than the rule based exposure value by more than a predetermined amount or less than by approximately the predetermined amount. At block 318, the automatic exposure mechanism can set an exposure time using a metered exposure value in conjunction with a polynomial equation if the metered exposure value is less than the rule based exposure value by less than a predetermined amount. The polynomial equation (e.g., cubic polynomial such as $2x^2-x^3$) is used to determine the exposure value. In this embodiment, the predetermined rule is based on the Sunny f/16 rule.

After the automatic exposure mechanism has determined the exposure time at block 314, 316, or 318, still images or video can be captured with the image capturing device at block 320.

Figure 4:
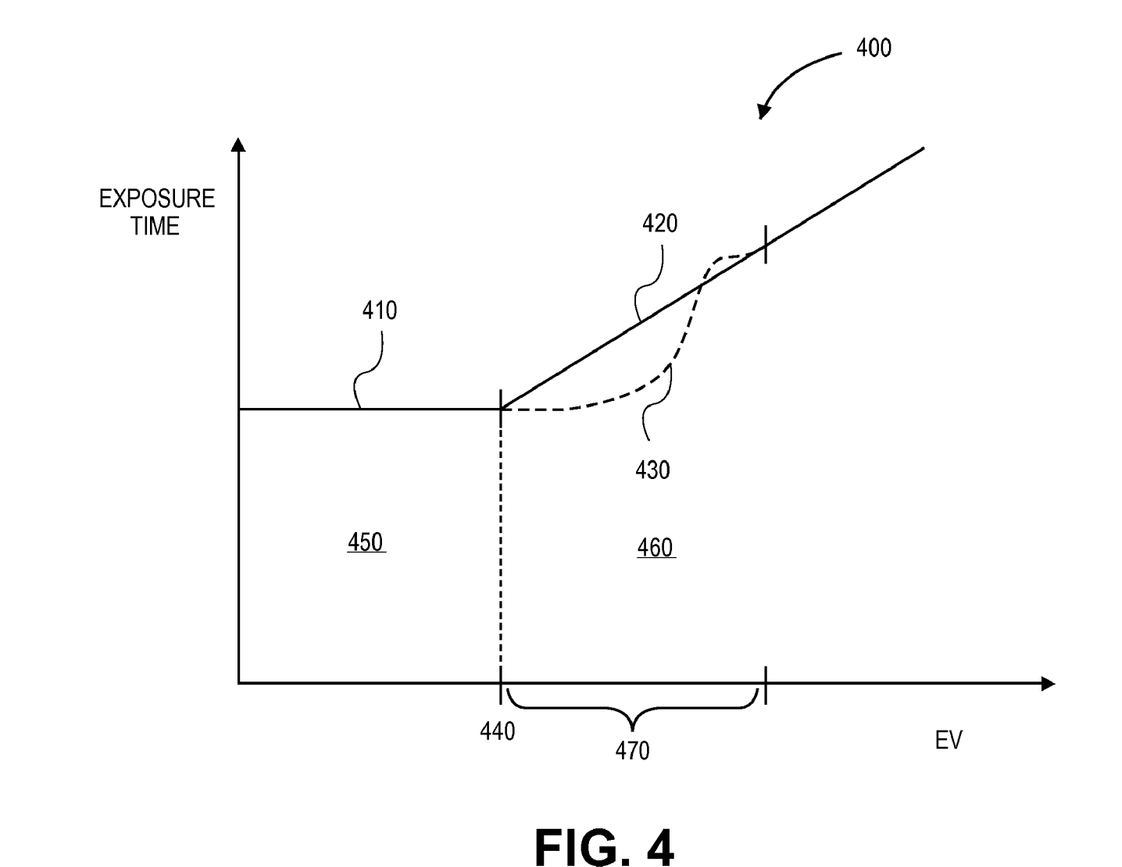
FIG. 4 illustrates a graph of exposure time versus brightness in accordance with embodiments.

FIG. 4 illustrates a graph of exposure time versus exposure value (EV) in accordance with some embodiments. A boundary 440 represents a boundary where a metered exposure value associated with incident light equals a rule based exposure value (e.g., Sunny f/16 rule). The boundary 440 separates a region 450 and a region 460. The region 450 occurs when the metered exposure value exceeds the rule based exposure value. In this case, the rule based exposure value is used for determining exposure limits (e.g., exposure time associated with line 410) rather than the metered exposure value because the metered exposure value is indicating a brightness greater than a brightness of sunlight.

In one embodiment, the rule based exposure value is determined based on the Sunny f/16 rule for sunlight reflected from a reference object (e.g., 18% gray card). The region 450 represents a scene that is brighter than a brightness of reflected sunlight from the reference object. The region 460 represents a scene that is less bright than reflected sunlight from the reference object. In this case, the metered exposure value may be used for determining exposure limits (e.g., exposure time associated with line 420 or line 430).

In some embodiments, exposure settings determined from the metered exposure value are modified based on a polynomial curve 430 associated with a polynomial equation (e.g., cubic polynomial such as $2x^2-x^3$ with the transition range being normalized to 0...1) to alleviate any imaging problems resulting from discontinuity at the transition between the metered exposure line 420 and the rule based line 410. The curve 430 is applied for metered exposure values less than the rule based exposure value by less than to a predetermined amount 470. For example, the curve 430 may allow better image quality for certain lighting conditions such a sunlight object that is slightly darker than sunlight reflected from a 18% gray card (e.g., a violet flower in sunlight).

In a specific embodiment, an image capturing device has a f-number of 2.8, an ISO setting of 70 for sunlight, and the exposure time may be determined based on the graph 400. In this case, if the exposure time from the meter is less than 1/2200 of a second, then the rule based exposure value can be applied and the exposure time is limited to 1/2200 of a second. If the exposure time from the meter is greater than 1/2200 of a second, then the metered exposure value can be applied and the exposure time is determined based on region 460.

Many of the methods in embodiments of the present invention may be performed with a digital processing system, such as a conventional, general-purpose computer system. Special purpose computers, which are designed or programmed to perform only one function, may also be used.

Figure 5:
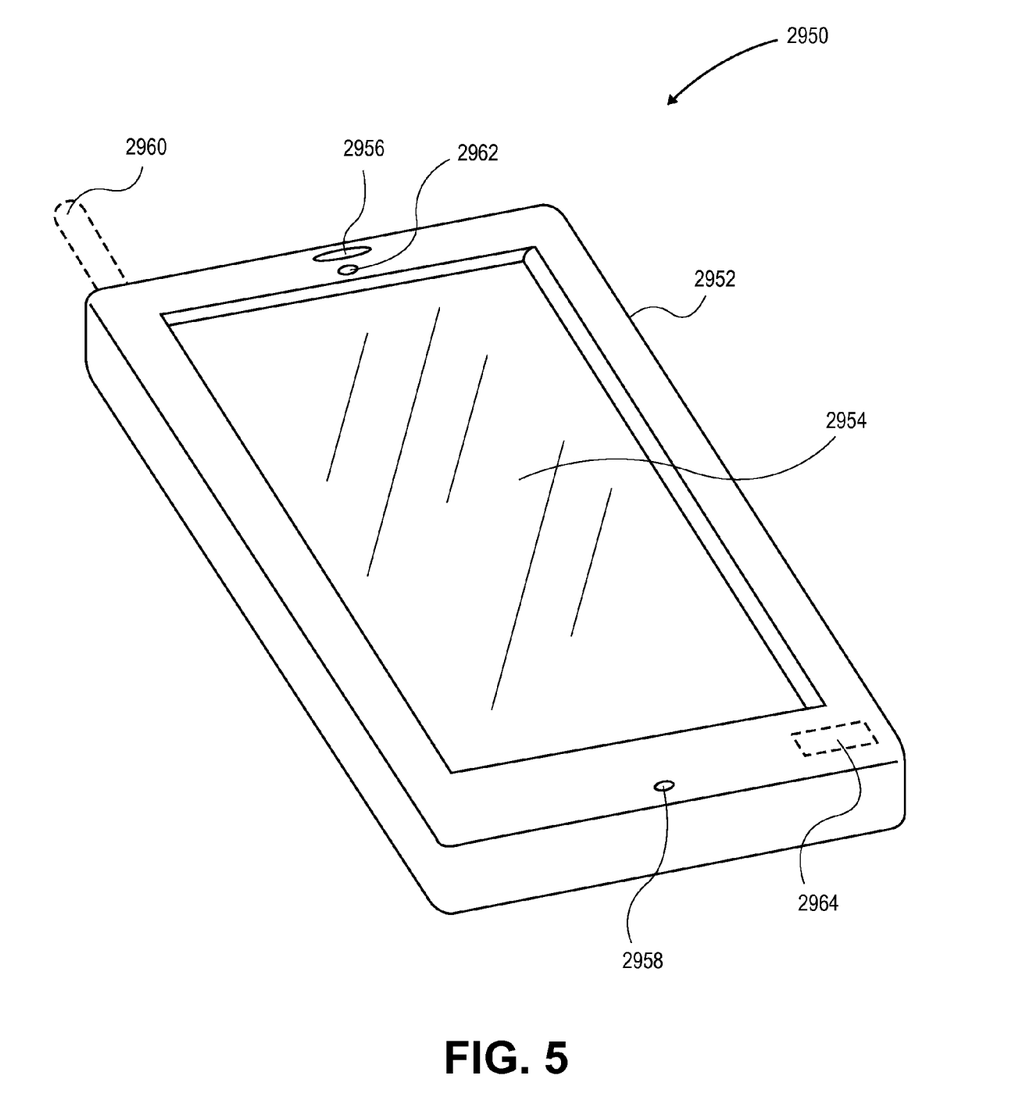
FIG. 5 shows an image capturing device 2950 in accordance with one embodiment.
Figure 6:
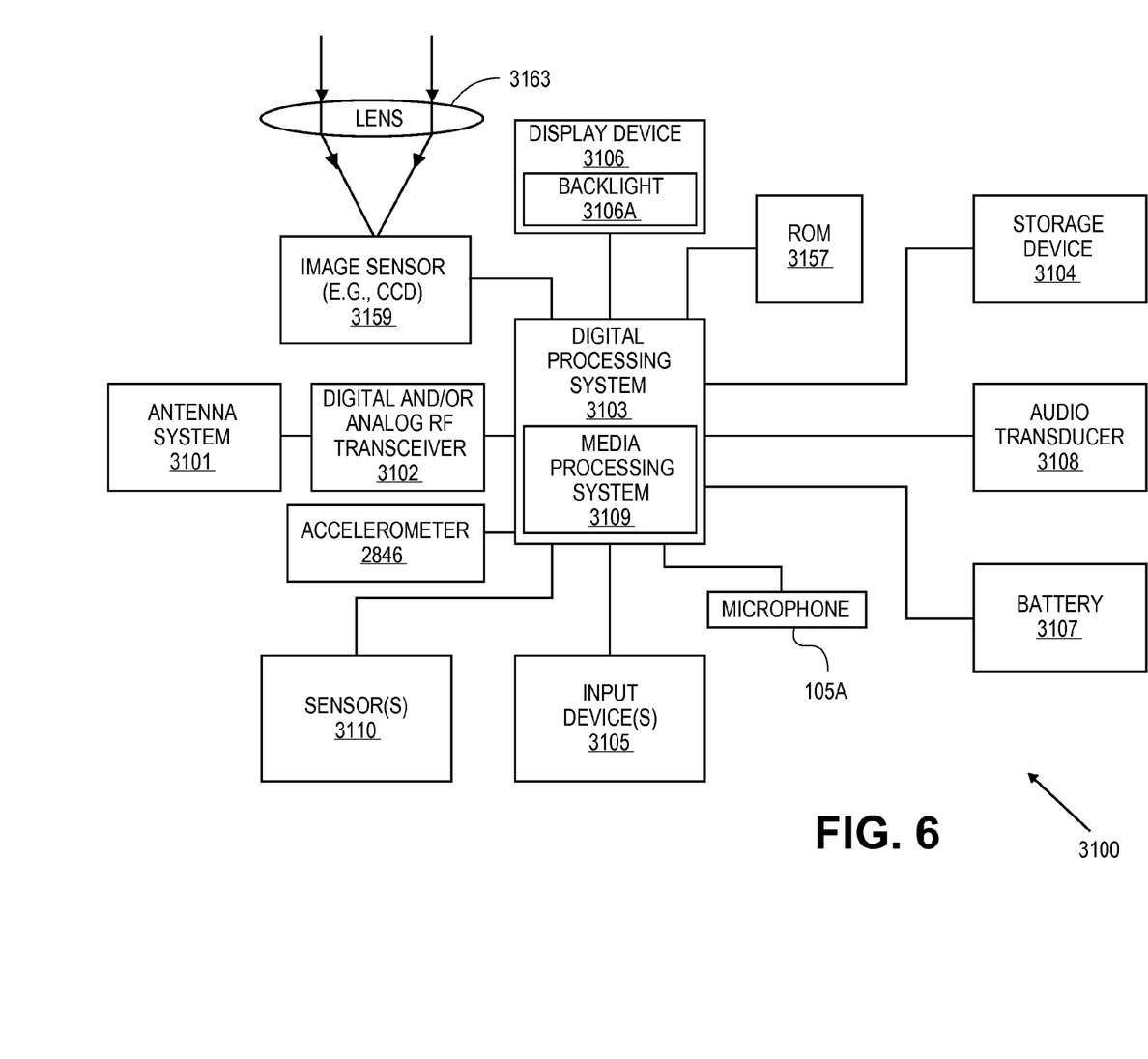
FIG. 6 shows an embodiment of a wireless image capturing device.
Figure 7:
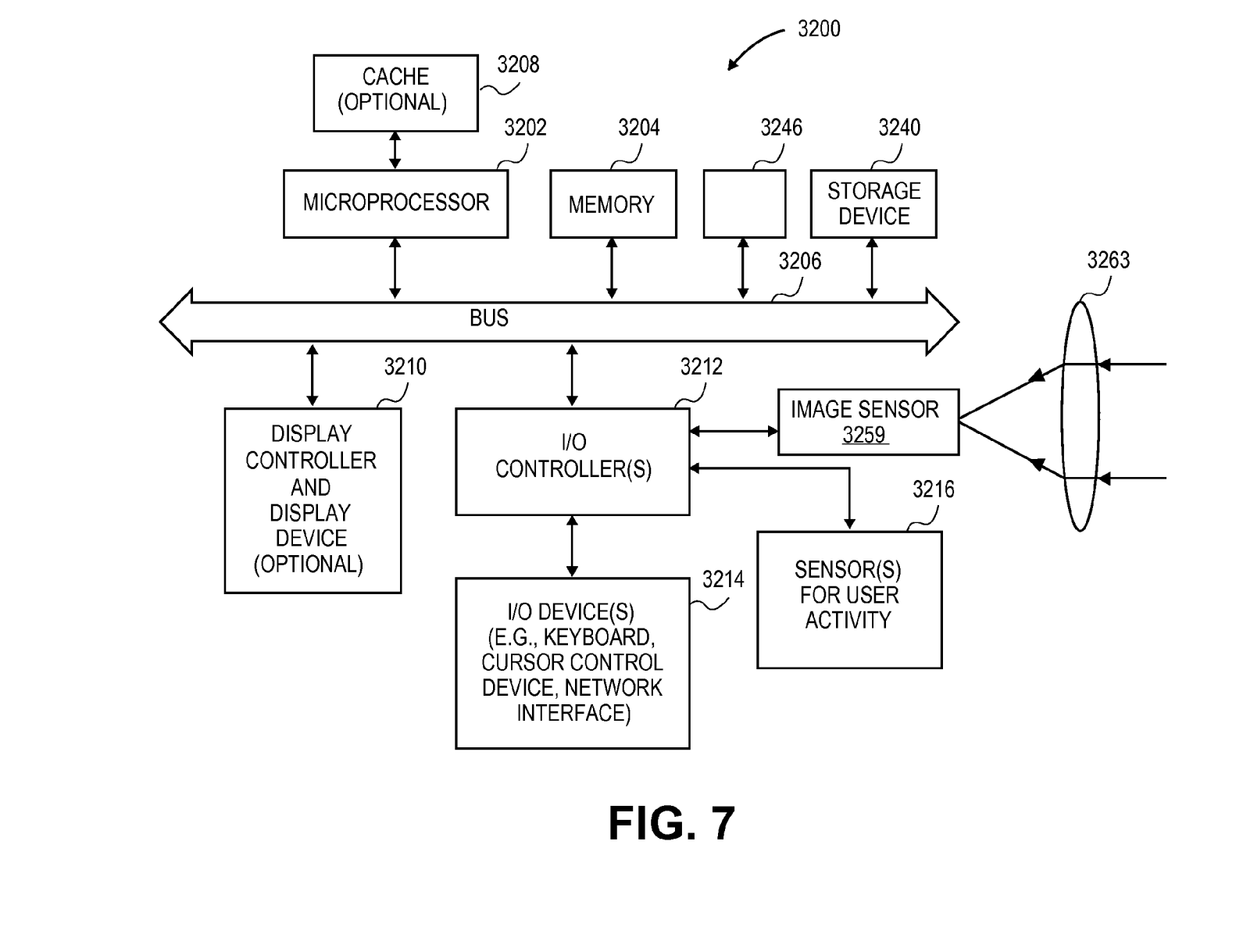
FIG. 7 shows an example of a data processing system according to an embodiment.

In some embodiments, the methods, systems, and apparatuses of the present disclosure can be implemented in various devices including electronic devices, consumer devices, data processing systems, desktop computers, portable computers, wireless devices, cellular devices, tablet devices, handheld devices, multi touch devices, multi touch data processing systems, any combination of these devices, or other like devices. FIGS. 5-7 illustrate examples of a few of these devices, which are capable of capturing still images and video to implement the methods of the present disclosure.

FIG. 5 shows an image capturing device 2950 in accordance with one embodiment of the present invention. The device 2950 may include a housing 2952, a display/input device 2954, a speaker 2956, a microphone 2958 and an optional antenna 2960 (which may be visible on the exterior of the housing or may be concealed within the housing). The device 2950 also may include a proximity sensor 2962 and an accelerometer 2964. The device 2950 may be a cellular telephone or a device which is an integrated PDA and a cellular telephone or a device which is an integrated media player and a cellular telephone or a device which is both an entertainment system (e.g. for playing games) and a cellular telephone, or the device 2950 may be other types of devices described herein. In one particular embodiment, the device 2950 may include a cellular telephone and a media player and a PDA, all contained within the housing 2952. The device 2950 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer, an iPhone, and an iPod are portable devices.

In certain embodiments of the present disclosure, the device 2950 can be used to implement at least some of the methods discussed in the present disclosure.

FIG. 6 shows an embodiment of a wireless image capturing device which includes the capability for wireless communication and for capturing images. Wireless device 3100 may include an antenna system 3101. Wireless device 3100 may also include a digital and/or analog radio frequency (RF) transceiver 3102, coupled to the antenna system 3101, to transmit and/or receive voice, digital data and/or media signals through antenna system 3101.

Wireless device 3100 may also include a digital processing system 3103 to control the digital RF transceiver and to manage the voice, digital data and/or media signals. Digital processing system 3103 may be a general purpose processing system, such as a microprocessor or controller for example. Digital processing system 3103 may also be a special purpose processing system, such as an ASIC (application specific integrated circuit), FPGA (field-programmable gate array) or DSP (digital signal processor). Digital processing system 3103 may also include other devices, as are known in the art, to interface with other components of wireless device 3100. For example, digital processing system 3103 may include analog-to-digital and digital-to-analog converters to interface with other components of wireless device 3100. Digital processing system 3103 may include a media processing system 3109, which may also include a general purpose or special purpose processing system to manage media, such as files of audio data.

Wireless device 3100 may also include a storage device 3104, coupled to the digital processing system, to store data and/or operating programs for the Wireless device 3100. Storage device 3104 may be, for example, any type of solid-state or magnetic memory device. Storage device 3104 may be or include a machine-readable medium.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

Wireless device 3100 may also include one or more input devices 3105, coupled to the digital processing system 3103, to accept user inputs (e.g., telephone numbers, names, addresses, media selections, etc.) Input device 3105 may be, for example, one or more of a keypad, a touchpad, a touch screen, a pointing device in combination with a display device or similar input device.

Wireless device 3100 may also include at least one display device 3106, coupled to the digital processing system 3103, to display information such as messages, telephone call information, contact information, pictures, movies and/or titles or other indicators of media being selected via the input device 3105. Display device 3106 may be, for example, an LCD display device. In one embodiment, display device 3106 and input device 3105 may be integrated together in the same device (e.g., a touch screen LCD such as a multi-touch input panel which is integrated with a display device, such as an LCD display device). The display device 3106 may include a backlight 3106A to illuminate the display device 3106 under certain circumstances. It will be appreciated that the wireless device 3100 may include multiple displays.

Wireless device 3100 may also include a battery 3107 to supply operating power to components of the system including digital RF transceiver 3102, digital processing system 3103, storage device 3104, input device 3105, microphone 3105A, audio transducer 3108, media processing system 3109, sensor(s) 3110, and display device 3106, an image sensor 3159 (e.g., charge coupled device (CCD) or CMOS based image sensors). The display device 3106 may include a Liquid Crystal Display (LCD) which may be used to display images which are captured or recorded by the wireless image capturing device 3100. The LCD serves as a viewfinder of a camera and there may optionally be other types of image display devices on device 3100 which can serve as a viewfinder.

The device 3100 also includes an imaging lens 3163 which can be disposed over sensor 3159. The processing system 3103 controls the operation of the device 3100; and, it may do so by executing a software program stored in ROM 3157, or in the processing system 3103, or in both ROM 3157 and the processing system 3103.

The processing system 3103 controls the image processing operation; and, it controls the storage of a captured image in storage device 3104. The processing system 3103 also controls the exporting of image data (which may or may not be color corrected) to an external general purpose computer or special purpose computer.

The processing system 3103 also responds to user commands (e.g., a command to "take" a picture or video by capturing an image on the sensor and storing it in memory or a command to select an option for contrast enhancement and color balance adjustment).

The ROM 3157 may store software instructions for execution by the processing system 3103 to perform the automatic exposure mechanisms discussed in the present disclosure. The automatic exposure mechanism may be configured to use data from a light meter, coupled to the processing circuit, to provide a metered exposure value for incident light and to determine a rule based exposure value based on a predetermined rule, given a predetermined light sensitivity of capture media (e.g., image sensor 3159) and given a predetermined f-number of the image capturing device. The light meter may be integrated with the image sensor 3159 or may be external to the image sensor. The light meter may receive light focused by the lens or may receive incident light directly.

The storage device 3104 is used to store captured/recorded images which are received from the sensor 3159. It will be appreciated that other alternative architectures of a camera can be used with the various embodiments of the invention.

Battery 3107 may be, for example, a rechargeable or non-rechargeable lithium or nickel metal hydride battery. Wireless device 3100 may also include audio transducers 3108, which may include one or more speakers, and at least one microphone 3105A, and an accelerometer 2846.

In some embodiments, the image capturing device 3100 includes the storage device 3104 to store a plurality of captured images and the lens 3163 to receive incident light associated with an image to be captured. The processing system 3103 may be configured to perform an automatic exposure mechanism that may be configured to use a light meter, coupled to the processing system, to provide a metered exposure value for the incident light. The automatic exposure mechanism can determine a rule based exposure value based on a predetermined rule, given a predetermined light sensitivity of the capture media and given a predetermined f-number of the image capturing device.

The processing system may be further configured to determine whether the metered exposure value is greater than the rule based exposure value. The processing system may be further configured to set an exposure time using the rule based exposure value rather than the metered exposure value if the metered exposure value is greater than the rule based exposure value. The processing circuit may be further configured to set an exposure time using the metered exposure value if the metered exposure value is less than or substantially equal to the rule based exposure value. The processing system may be further configured to set an exposure time using an exposure value based on a polynomial equation rather than the metered exposure value if the metered exposure value is less than the rule based exposure value by a predetermined amount.

The device may further include a camera (e.g., lens 3163 and image sensor 3159) coupled to the processing system 3103.

FIG. 7 shows an example of a data processing system according to an embodiment of the present invention. This data processing system 3200 may include a processor, such as microprocessor 3202, and a memory 3204, which are coupled to each other through a bus 3206. The data processing system 3200 may optionally include a cache 3208 which is coupled to the microprocessor 3202. The data processing system may optionally include a storage data processing system 3240 which may be, for example, any type of solid-state or magnetic memory data processing system. Storage data processing system 3240 may be or include a machine-readable medium.

This data processing system may also optionally include a display controller and display data processing system 3210 which is coupled to the other components through the bus 3206. One or more input/output controllers 3212 are also coupled to the bus 3206 to provide an interface for input/output data processing systems 3214 and to provide an interface for one or more sensors 3216 which are for sensing user activity. The bus 3206 may include one or more buses connected to each other through various bridges, controllers, and/or adapters as is well known in the art. The input/output data processing systems 3214 may include a keypad or keyboard or a cursor control data processing system such as a touch input panel. Furthermore, the input/output data processing systems 3214 may include a network interface which is either for a wired network or a wireless network (e.g. an RF transceiver). The sensors 3216 may be any one of the sensors described herein including, for example, a proximity sensor or an ambient light sensor. In at least some implementations of the data processing system 3200, the microprocessor 3202 may receive data from one or more sensors 3216 or from image sensor 3259 and may perform the analysis of that data in the manner described herein. Image sensor 3259 captures an image via light focused by lens 3263. Orientation detector 3246 may be used to detect an orientation of the system 3200.

In certain embodiments of the present disclosure, the data processing system 3200 can be used to implement at least some of the methods discussed in the present disclosure.

The methods of the present invention can be implemented using dedicated hardware (e.g., using Field Programmable Gate Arrays, or Application Specific Integrated Circuit, which many be integrated with image sensors, such as CCD or CMOS based image sensors) or shared circuitry (e.g., microprocessors or microcontrollers under control of program instructions stored in a machine readable medium, such as memory chips) for an imaging device, such as device 3100 in FIG. 11. The methods of the present invention can also be implemented as computer instructions for execution on a data processing system, such as system 3200 of FIG. 12.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method, comprising:
using data from a light meter of an image capturing device to determine a metered exposure value associated with incident light;
determining a rule based exposure value based on a predetermined rule, a light sensitivity of a capture media, and a f-number of the image capturing device; and
automatically selecting either the metered exposure value or the rule based exposure value to set an exposure setting for the image capturing device, wherein the automatically selecting includes setting an exposure time using the metered exposure value if the metered exposure value is less than the rule based exposure value; further comprising
setting an exposure time using an exposure value based on a cubic polynomial equation rather than the metered exposure value if the metered exposure value is less than the rule based exposure value by less than a predetermined amount.

2. The method of claim 1, wherein the automatically selecting comprises determining whether the metered exposure value is greater than the rule based exposure value.

3. The method of claim 2, further comprising:
setting an exposure time using the rule based exposure value rather than the metered exposure value if the metered exposure value is greater than the rule based exposure value.

4. The method of claim 1, wherein the predetermined rule is based on a Sunny f/16 rule for sunlight reflected from a reference object.

5. A machine readable medium containing executable computer program instructions which when executed by a data processing system causes said system to perform a method comprising:
using data from a light meter of an image capturing device to determine a metered exposure value associated with incident light;
determining a rule based exposure value based on a predetermined rule, a light sensitivity of a capture media, and a f-number of the image capturing device; and
automatically selecting either the metered exposure value or the rule based exposure value to set an exposure setting for the image capturing device, wherein the automatically selecting includes setting an exposure time using the metered exposure value if the metered exposure value is less than the rule based exposure value; further comprising
setting an exposure time using an exposure value based on a cubic polynomial equation rather than the metered exposure value if the metered exposure value is less than the rule based exposure value by a predetermined amount.

6. The medium of claim 5, wherein the automatically selecting comprises determining whether the metered exposure value is greater than the rule based exposure value.

7. The medium of claim 6, further comprising:
setting an exposure time using the rule based exposure value rather than the metered exposure value if the metered exposure value is greater than the rule based exposure value.

8. The medium of claim 5, wherein the predetermined rule is based on a Sunny f/16 rule for sunlight reflected from a reference object.

9. An image capturing device, comprising:
a storage device to store a plurality of captured images;
a capture media coupled to the storage device, the capture media to capture an image associated with incident light;
a processing system coupled to the storage device, the processing system is configured to perform an automatic exposure mechanism that is configured to use a light meter, coupled to the processing system, to provide a metered exposure value for the incident light and to determine a rule based exposure value based on a predetermined rule and predetermined exposure settings of the image capturing device and is configured to automatically select either the metered exposure value or the rule based exposure value to set an exposure setting for the image capturing device, wherein the processing system is configured to automatically select by setting an exposure time using the metered exposure value if the metered exposure value is less than the rule based exposure value; and
wherein the processing system is further configured to set an exposure time using an exposure value based on a cubic polynomial equation rather than the metered exposure value if the metered exposure value is less than the rule based exposure value by a predetermined amount.

10. The image capturing device of claim 9, wherein the processing system is configured to automatically select by determining whether the metered exposure value is greater than the rule based exposure value.

11. The image capturing device of claim 10, wherein the processing system is further configured to limit an exposure time using the rule based exposure value rather than the metered exposure value if the metered exposure value is greater than the rule based exposure value.

12. The image capturing device of claim 11, further comprising:
a lens coupled to the capture media, the lens to receive incident light and focus the incident light onto the capture media.

13. The image capturing device of claim 12, wherein the lens to focus the incident light on the light meter.

14. The image capturing device of claim 9, wherein the predetermined exposure settings comprise a predetermined light sensitivity of the capture media and a predetermined f-number of the image capturing device.

* * * * *